United States Patent [19]
Steffens, Jr. et al.

[11] Patent Number: 6,094,610
[45] Date of Patent: Jul. 25, 2000

[54] CHARACTERIZING A PROXIMATELY LOCATED OCCUPANT BODY PORTION WITH A SENSOR MATRIX

[75] Inventors: Charles E. Steffens, Jr., Washington; John G. Bauer, Troy, both of Mich.

[73] Assignee: TRW Vehicle Safety Systems Inc., Lyndhurst, Ohio

[21] Appl. No.: 09/050,848

[22] Filed: Mar. 30, 1998

[51] Int. Cl.[7] .................................................. B60R 21/32
[52] U.S. Cl. ............................. 701/45; 280/735; 340/562
[58] Field of Search ....................... 701/45, 47; 180/268, 180/271, 272, 287; 340/500, 540, 561, 562, 563, 564, 657; 307/116, 123, 131, 9.1, 10.1; 280/728.1, 735

[56] References Cited

U.S. PATENT DOCUMENTS

| | | | |
|---|---|---|---|
| 4,796,013 | 1/1989 | Yasuda et al. | 340/562 |
| 5,071,160 | 12/1991 | White et al. | 280/735 |
| 5,232,243 | 8/1993 | Blackburn et al. | 280/732 |
| 5,330,226 | 7/1994 | Gentry et al. | 280/735 |
| 5,366,241 | 11/1994 | Kithil | 280/735 |
| 5,413,378 | 5/1995 | Steffens, Jr. et al. | 280/735 |
| 5,439,249 | 8/1995 | Steffens, Jr. et al. | 280/735 |
| 5,446,661 | 8/1995 | Gioutsos et al. | 701/45 |
| 5,482,314 | 1/1996 | Corrado et al. | 280/735 |
| 5,494,311 | 2/1996 | Blackburn et al. | 280/735 |
| 5,525,843 | 6/1996 | Höwing | 307/9.1 |
| 5,528,698 | 6/1996 | Kamei et al. | 382/100 |
| 5,585,625 | 12/1996 | Spies | 250/221 |
| 5,602,734 | 2/1997 | Kithil | 701/45 |
| 5,624,132 | 4/1997 | Blackburn et al. | 280/735 |
| 5,653,462 | 8/1997 | Breed et al. | 280/735 |
| 5,722,686 | 3/1998 | Blackburn et al. | 280/735 |
| 5,848,661 | 12/1998 | Fu | 180/273 |
| 5,890,085 | 3/1999 | Corrado et al. | 701/47 |

OTHER PUBLICATIONS

P. 75 of Automotive Engineering, May, 1997.
Article entitled "Capacitive Proximity Sensor has Longer Range", NASA Tech Briefs, Aug., 1992.

*Primary Examiner*—William A. Cuchlinski, Jr.
*Assistant Examiner*—Edward Pipala
*Attorney, Agent, or Firm*—Tarolli, Sundheim, Covell, Tummino & Szabo L.L.P.

[57] ABSTRACT

An occupant sensor system (40) has an array (42) of sensors (48$_I$–48$_{IV}$). Each of the sensors (48$_I$–48$_{IV}$) senses the presence of a body portion of an occupant (14) proximately located to the respective sensor and provides a signal (50) indicative of the presence. A controller (30) processes information derived from the signals (50) to characterize the type of the body portion.

37 Claims, 4 Drawing Sheets

CHARACTERIZING A PROXIMATELY LOCATED OCCUPANT BODY PORTION WITH A SENSOR MATRIX

FIELD OF THE INVENTION

The present invention is directed to occupant sensing and is particularly directed to occupant sensing for use within a vehicle occupant protection system.

BACKGROUND OF THE INVENTION

Vehicle occupant protection systems that have an actuatable protection device are well known in the art. One particular type of actuatable protection system includes an inflatable protection module. An inflatable protection device of the module is commonly referred to as an air bag, and is mounted to inflate within an occupant compartment of a vehicle. The inflatable protection module has a source of inflation fluid and an electrically actuatable igniter, referred to as a squib.

The occupant protection system further includes a collision/crash sensor for sensing the occurrence of a vehicle crash condition and for providing an electrical signal indicative of the crash condition. When the sensor indicates that the vehicle is in a crash condition requiring inflation of the air bag to help protect a vehicle occupant (i.e., a deployment crash condition), an electrical signal is provided to the squib for the purpose of igniting the squib. The squib, when ignited, activates the source of inflation fluid (e.g., ignition of a combustible, gas or heat generating composition and/or opening of a container of pressurized gas). The source of inflation fluid is operatively coupled to the air bag, and, when activated, inflates the air bag.

Several known occupant protection systems include an occupant position sensor that senses the position of the occupant with respect to an associated inflatable protection module. The occupant position sensor for such a system is an ultrasonic sensor, an infrared sensor, a capacitive sensor, or a weight sensor. A controller, which is operatively connected to the sensor, controls the associated inflatable protection module in response to the sensed position of a vehicle occupant. Specifically, in response to the sensed occupant position, one or more deployment aspects of the air bag may be adjusted. The deployment aspects of the air bag include suppression of deployment of the air bag entirely, adjustment of timing of the air bag deployment, adjustment of pressure of the inflated air bag, and aiming of the air bag. The adjustable aspects that are directed to adjustment of a deploying air bag are referred to collectively as adjustments to the dynamic profile of the air bag. A protection system with adjustable aspects is commonly referred to as an "adaptive" protection system.

Focusing now on suppression of air bag deployment, in certain circumstances, even if the determined deployment crash condition occurs, it maybe desirable to refrain from actuating the occupant protection module of the protection system (i.e., refrain from inflating the air bag). Specifically, if the occupant associated with the occupant protection module is located in a position such that actuating the occupant protection module and deploying the air bag will not enhance protection of the occupant, it may be desirable to suppress actuation of the occupant protection module. An occupant who is very near the protection module is referred to as being within an occupant out-of-position zone. Deploying the air bag for an occupant who is within the occupant out-of-position zone may not enhance protection of the occupant. Ideally, the determination as to whether an occupant is within an occupant out-of-position zone is dependent upon some position of the occupant's thorax or torso, and head, with regard to the protection module. The determination may also be dependent upon the vehicle interior geometry, the crash condition, the type of restraint system, and/or the size of the occupant.

SUMMARY OF THE INVENTION

In accordance with one aspect, the present invention provides an occupant sensor system that has an array of sensor means. Each sensor means senses the presence of a body portion of an occupant proximately located to the respective sensor means and provides a signal indicative of the presence. Processing means processes information derived from the signals to characterize the type of the body portion.

In accordance with another aspect, the present invention provides an occupant sensor system with a sensor array having a plurality of sensor means. Each sensor means senses a proximity of an occupant body portion and provides a signal indicative of the proximity. Processing means processes information derived from the signals provided by the plurality of sensor means to make a characterization of the proximately located occupant body portion and provides a signal indicative of the characterization.

In accordance with another aspect, the present invention provides an occupant sensor system. The system includes a capacitive sensor plate array having a plurality of capacitive plates. Each capacitive plate is arranged to pair itself with each of the other capacitive plates to define a capacitor having a capacitive value. The capacitive value of each pair of capacitive plates is indicative of proximity of a body portion of an occupant to the respective pair of capacitive plates. Means senses the capacitive value of each pair of capacitive plates and provides signals indicative of the capacitive values. Processing means processes information derived from the signals to characterize the proximately located occupant body portion and provides a signal indicative of the capacitive value.

In accordance with yet another aspect, the present invention provides an occupant protection system. The system includes an array of sensor means. Each sensor means senses the presence of a body portion of an occupant proximately located to the respective sensor means and provides a signal indicative of the presence. Processing means processes information contained within the signals to characterize the type of body portion. Protection means is actuatable for helping to protect an occupant. Control means controls actuation of the protection means in response to the characterization of the type of the body portion.

In accordance with yet another aspect, the present invention provides an occupant sensing method. An array of sensor means is provided. The presence of a body portion of an occupant proximately located to each sensor means is sensed. Signals indicative of the sensed presence are provided. The information derived from the signals is processed to characterize the body portion as to its type.

In accordance with still another aspect, the present invention provides an occupant sensing method. A sensor array is provided, which has a plurality of sensor means. A proximity of an occupant body portion to each sensor means is sensed. A signal indicative of the sensed proximity is provided for each sensor means. Information derived from the signals provided for each sensor means is processed. A characterization of the proximately located occupant body portion is made based upon the processing. A signal indicative of the characterization is provided.

In accordance with still another aspect, the present invention provides an occupant sensing method. A capacitive sensor plate array is provided, which has a plurality of capacitive plates. Each capacitive plate is arranged to pair the plate with each of the other capacitive plates to define a capacitor having a capacitive value. The capacitive value is indicative of proximity of a body portion of an occupant to the respective pair of capacitive plates. The capacitive value of each pair of capacitive plates is sensed. Signals indicative of the capacitive values are provided. Information derived from the signals is processed to make a characterization of the proximately located occupant body portion. A signal indicative of the characterization is provided.

In accordance with yet still another aspect, the present invention provides an occupant protection method. An array of sensor means is provided. The presence of a body portion of an occupant proximately located to each sensor means is sensed. Signals indicative of the sensed presence are provided. Information contained within the signals is processed to characterize the body portion as to its type. Actuation of actuatable protection means is controlled to help to protect an occupant in response to the characterization of the type of the body portion.

BRIEF DESCRIPTION OF THE DRAWINGS

The foregoing and other features of the present invention will becomes apparent to one skilled in the art to which the present invention relates upon consideration of the following description of the invention with reference to the accompanying drawings, wherein.

DESCRIPTION OF PREFERRED EMBODIMENTS

Figure 1:
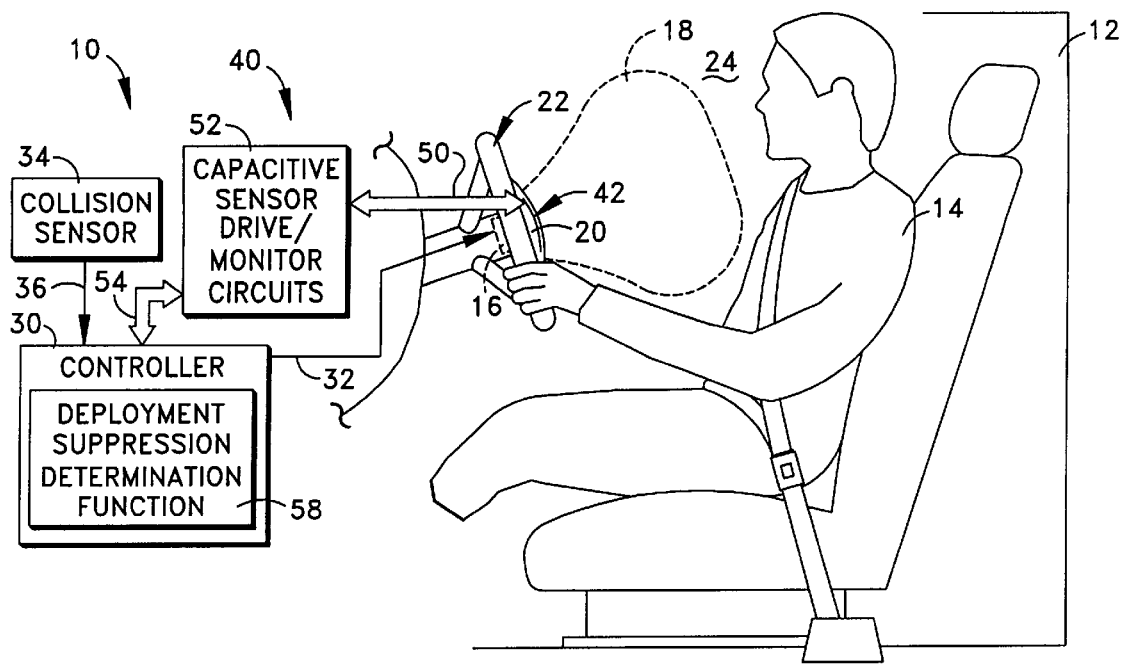
FIG. 1 is a schematic illustration of a system in accordance with the present invention, within a vehicle containing an occupant.

An occupant protection system 10 is schematically shown in FIG. 1 within a vehicle 12. The protection system 10 is provided for a vehicle occupant 14, who is the vehicle driver and who is seated on a driver's seat. It is to be appreciated that the protection system 10 may be configured differently and provided for a vehicle passenger, who is seated on a passenger's seat.

Within the protection system 10 is an actuatable occupant protection module 16 (shown in phantom to indicate hidden from view), which includes an inflatable occupant protection device 18 (shown in phantom to indicate a certain position). The inflatable occupant protection device 18 is commonly referred to as an air bag. Many other actuatable vehicle occupant protection devices that could be used in accordance with the invention include, for example, actuatable seat belts, actuatable knee bolsters, actuatable head liners or side curtains, and knee bolsters operated by inflatable air bags.

The occupant protection module 16 is mounted within a hub 20 of a steering wheel 22 of the vehicle 12. Prior to inflation deployment, the air bag 18 is folded and stored within the steering wheel hub 20, as is known in the art. Within the occupant protection module 16, a source of inflation fluid is operatively connected to the air bag 18. Inflation fluid from the source, which may be generated by combustion of pyrotechnic material and/or released from a pressurized container, fills the air bag 18 to an inflated condition (shown in FIG. 1) within an occupant compartment 24 of the vehicle 12. Once inflated, as occurs during a vehicle collision, the air bag 18 helps to protect the occupant 14.

The occupant protection system 10 is of the type referred to in the art as an "adaptive protection" system, in that its operation has at least one adjustable aspect. In other words, the operation of the system is changeable to adapt to one or more certain occurrences or circumstances. In the preferred embodiment, the aspect that is adjustable is suppression of deployment of the air bag 18. A person of ordinary skill in the art will appreciate that other adjustable aspects include adjustment of inflation timing, adjustment of inflation pressure, adjustment of the rate of inflation and adjustment of location of the inflated air bag 18 relative to the occupant 14, etc.

Control of the occupant protection module 16, to adjust the adjustable aspect and to cause actuation of the occupant protection module, is by a controller 30. The controller 30 provides one or more control signals 32 to the occupant protection module 16. In one example, the controller 30 is a microcomputer. The controller 30 receives sensory input from several sources and, using the sensory input, makes determinations regarding occupant protection module control.

One of the sensory input sources for the controller 30 is a sensor 34 that senses a vehicle condition for which the occupant protection module 16 is to be actuated to help protect the occupant 14. The sensor provides a signal 36 to the controller 30 indicative of the sensed vehicle condition. In one example, which is illustrated in FIG. 1, the sensor 34 is a collision/crash sensor and senses a condition that is indicative of a vehicle collision or crash.

Preferably, the collision sensor 34 is an accelerometer, and the signal 36 is an electrical signal having a characteristic (e.g., voltage, frequency) indicative of the sensed crash deceleration. In another example, the sensor 34 senses a condition indicative of a vehicle rollover. It should be appreciated by a person of ordinary skill in the art that the occupant protection system 10 could have a plurality of sensors providing signals to the controller 30 that are indicative of a variety of vehicle conditions for which the inflatable vehicle occupant protection module 16 is to be actuated. Hereinafter, for the purpose of clarity, only the single collision sensor 34 and its collision indicative signal 36 are discussed.

The controller 30 analyzes the signal 36 from the collision sensor 34 and determines if a deployment crash condition is occurring (e.g., the controller operates a crash algorithm). A deployment crash condition is one in which deployment of the air bag 18 is desired to help protect the occupant 14. It is contemplated that any of several known crash algorithms can be used for the determination of a deployment crash condition. Examples of such algorithms are known in the art and are not discussed herein for brevity.

Sensory input to the controller 30 is also provided by an occupant capacitive sensor system 40. The occupant sensor system 40 includes a capacitive sensor array or matrix 42 in front of the occupant. It is to be appreciated that the sensor matrix 42 may be located elsewhere. In the illustrated example, the sensor matrix 42 is located on the steering wheel 22. In one embodiment (FIG. 2), the sensor matrix 42 is integrated into a hub cover 44 which encloses the inflatable occupant protection module 16 within the steering wheel hub 20. The hub cover 44 is made of resilient material (e.g., flexible plastic) and has a tear seam 46 for permitting expansion of the air bag 18, as will be appreciated by a person of ordinary skill in the art.

The sensor matrix 42 includes a plurality of capacitor plate members 48. In the embodiment illustrated in FIG. 2, there are four capacitor plates identified as $48_I$–$48_{IV}$. Although the members are referred to as capacitor plates, the members are preferably made of conductive foil. The foil is flexible and is embedded into the plastic of the hub cover 44. It is to be appreciated that any conductive material could be used, such as films, inks, etc. Hereinafter, the plates are referred to collectively and generically as plates 48, and are referred to by specific designation (e.g., $48_I$) for plate-specific discussion.

As is well known in the art, the capacitance value of a capacitor is functionally related to the dielectric constant of the material effectively between two plates that form a capacitor. Within the sensor matrix 42, a capacitor is formed between each pair of the capacitor plates 48. Accordingly, there are six effective capacitors formed by the six unique combination pairs of the capacitor plates 48.

Figure 2:
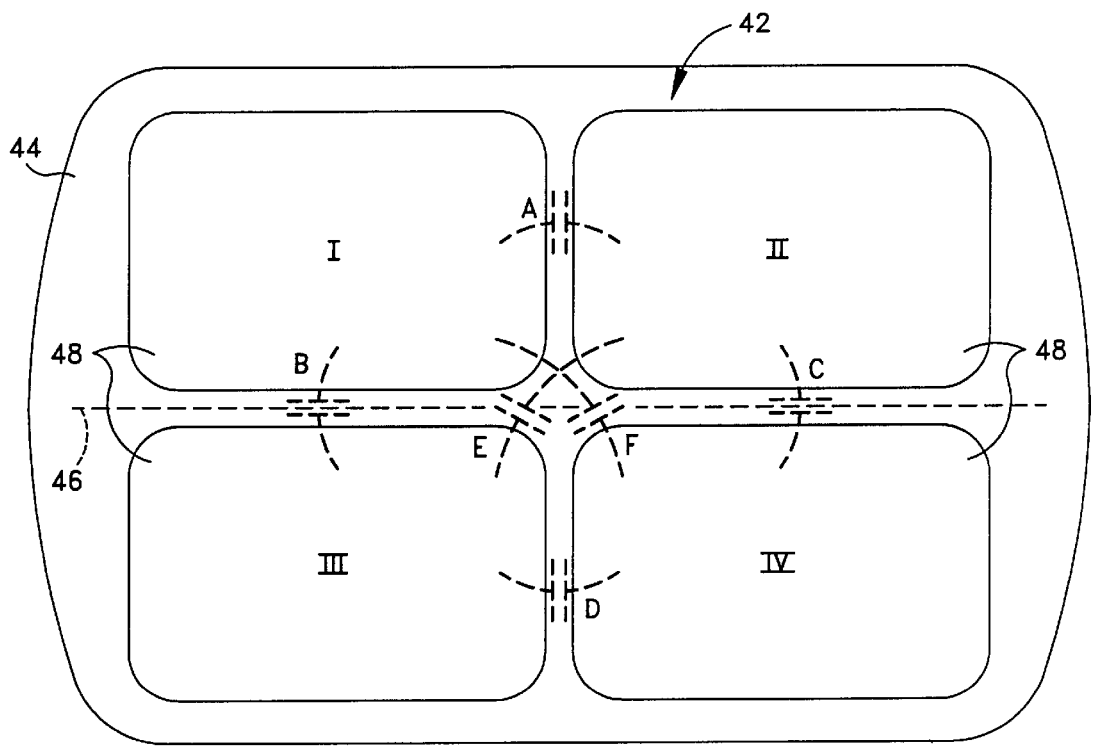
FIG. 2 is a schematic illustration of a sensor matrix of the system of FIG. 1.

The capacitive effect between the first and second capacitor plates $48_I$ and $48_{II}$ is represented in FIG. 2 by a phantom capacitor identified by letter A. The capacitive effect between the first and third capacitor plates $48_I$ and $48_{III}$ is represented by the phantom capacitor identified by letter B. The capacitive effect between the second and fourth capacitor plates $48_{II}$ and $48_{IV}$ is represented by the phantom capacitor identified by letter C. The capacitive effect between the third and fourth capacitor plates $48_{III}$ and $48_{IV}$ is represented by the phantom capacitor identified by letter D. The capacitive effect between the second and third capacitor plates $48_{II}$ and $48_{III}$ is represented by the phantom capacitor identified by letter E. The capacitive effect between the first and fourth capacitor plates $48_I$ and $48_{IV}$ is represented by the phantom capacitor identified by letter F. A person of ordinary skill in the art will appreciate that each phantom capacitor is representative of the respective electrostatic field extending between the respective pair of capacitor plates. Hereinafter, for the purpose of easy identification, the capacitor formed by each pair of capacitive plates is referred to by the same letter (e.g., "A") used in FIG. 2 to identify the phantom-drawn capacitors.

For each pair of capacitor plates 48, the effective dielectric between the plates includes the air between the plates. Also, for each pair of capacitor plates 48, any portion of the occupant's body that is proximate to the respective pair of capacitive plates becomes part of the effective dielectric for the respective pair of capacitive plates. The dielectric constant between each pair of capacitor plates 48 is related to the proximity of the occupant's body portion to the respective pair of plates. The closer the body portion is to the pair of plates 48, the greater the value of the effective dielectric. As the dielectric constant value increases, the capacitance value increases. Any body portion that is located proximate to a pair of capacitor plates 48 is also located proximate to inflatable occupant protection module 16 because the hub cover 44 encloses the inflatable occupant protection module.

The occupant sensor system 40 (FIG. 1) includes a plurality of capacitive sensor drive/monitor circuits 52. A drive/monitor circuit 52 is associated with each pair of capacitor plates 48. The drive/monitor circuits 52 provide drive signals (e.g., electrical excitation) to the capacitor plate pairs 48 and receive capacitance-indicative values, via signals 50. Each drive/monitor circuit 52 measures the variable capacitance value of the associated capacitor (e.g., the capacitor "A", defined by the plates $48_I$ and $48_{II}$), and outputs a signal indicative of the measured capacitance value. The drive/monitor circuits 52 may have any suitable structure for measuring the capacitance. Examples of such circuits are known in the art. Some examples of such circuits are discussed in U.S. patent application Ser. No. 442,190, to Blackburn et al., filed on May 16, 1995, and assigned to TRW Vehicle Safety Systems Inc. and TRW Technar Inc. Accordingly, the details of the drive/monitor circuits 52 are not discussed herein for the purpose of brevity.

The capacitance values, as measures by the drive/monitor circuits 52, are provided, via communication signals 54, to the controller 30. Part of the operation of the controller 30 includes a deployment suppression determination function 58. The deployment suppression determination function 58 may be performed by discrete, "hard-wired" components, may be performed by a software implementation, or may be performed be a combination of "hard-wire" components and software. The function 58 performs the following tasks: (1) monitor the signals 54 from the drive/monitor circuits 52, (2) determine which, if any, of the signals are indicative of a capacitance value in excess of a predetermined threshold value stored in the controller 30, (3) make a characterization of the location, type, size, etc. of any portion of the occupant's body that is located proximate to the sensor matrix 42 based upon the number of threshold values that are exceeded, and (4) permit, alter or suppress deployment of the air bag 18 dependent upon the characterization.

Suppression of the air bag deployment occurs because, in certain circumstances, even if the predetermined crash condition occurs, deploying the air bag 18 may not enhance protection of the occupant 14. Specifically, if the occupant 14 associated with the inflatable occupant protection module 16 is located in a position such that actuating the inflatable occupant protection module and deploying the air bag 18 may not enhance protection of the occupant, actuation of the module does not occur.

One example of a position of the occupant 14 for which actuation of the inflatable occupant protection module 16 may not enhance protection of the occupant is a position in which the torso/thorax and/or head of the occupant is very near the inflatable occupant protection module 16. An occupant 14 in such a near-module position is referred to as being within an occupant out-of-position zone (hereinafter referred to as the OOP zone). Deploying the air bag for an occupant who is within the occupant OOP zone may not enhance protection of the occupant.

Some certain body portions of the occupant 14 may be located very near the inflatable occupant protection module 16, and yet the occupant is not within the OOP zone. The body portions that may be located very near the protection module 16 while the occupant 14 is still not considered within the OOP zone include the arms and hands of the occupant. The deployment suppression determination function 58, in accordance with the present invention, discerns between proximately located objects and, as such, can characterize hand(s) and/or arm(s) of the occupant versus a proximately located torso/thorax and/or head, and controls actuation of the air bag accordingly. In other words, a body portion that is sensed as being proximate to the sensor matrix 42, and thus proximate to the inflatable occupant protection module 16, is characterized as being a hand/arm (occupant not in OOP zone) or a head/torso (occupant in OOP zone), and the characterization is used in the air bag control. A broader way to define the body characterization concept is that the sensed body portion is characterized as being head/torso or limb (non-head/torso).

Figure 3:
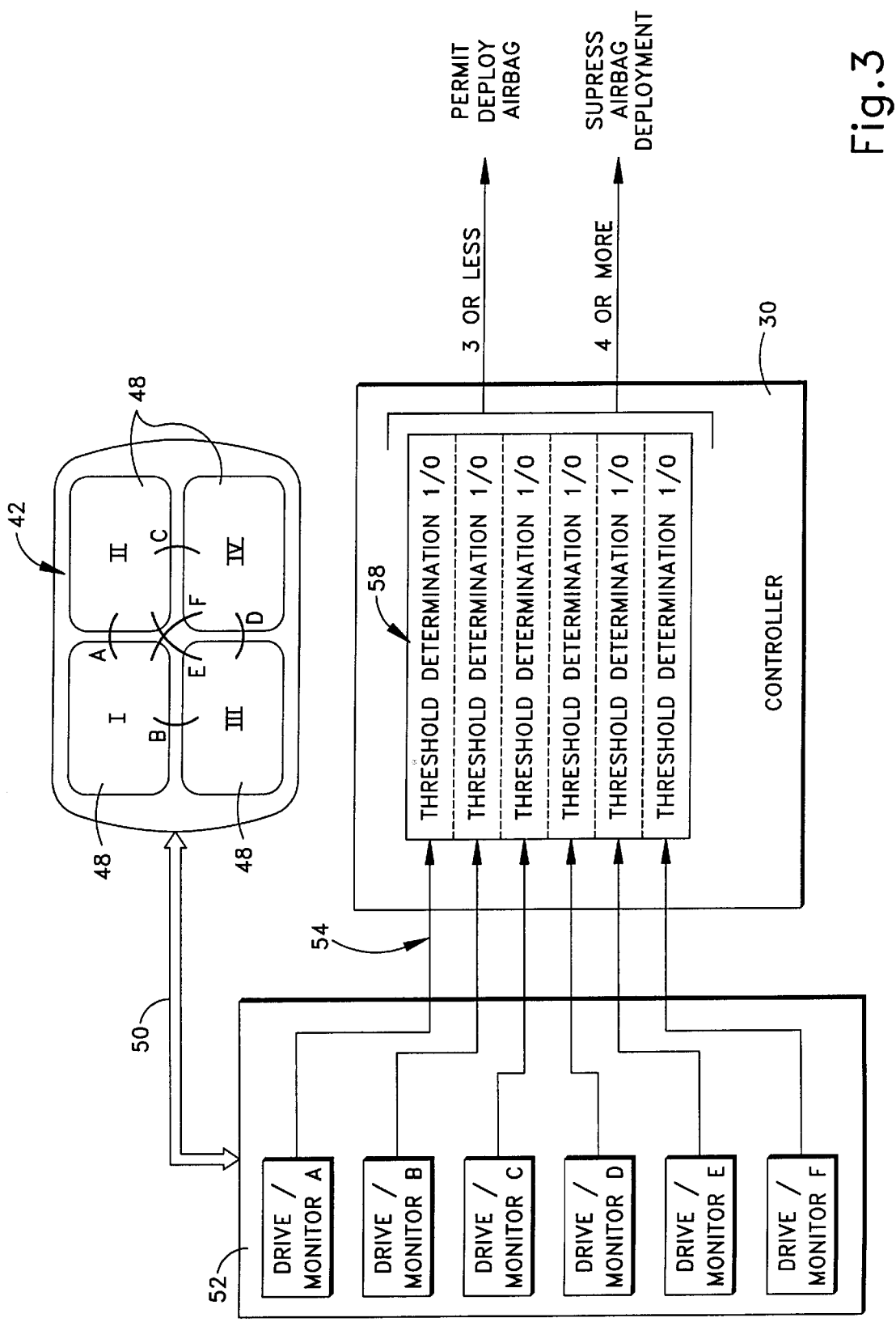
FIG. 3 is an illustration of operation of a portion of the system shown in FIG. 1.

FIG. 3 shows the plurality of drive/monitor circuits 52 (each identified by a letter A–F corresponding to its respective capacitor) providing the signals 54 to the controller 30.

Within the controller 30, the deployment suppression determination function 58 (represented in FIG. 3 by a plurality of threshold determination functions) makes the determinations as to whether each respective threshold value is exceeded. A logical 1 represents a determination that the respective threshold value is exceeded, and a logical 0 represents a determination that the threshold value is not exceeded. By analyzing the exceeded thresholds (e.g., counting the number), the deployment suppression determination function 58 of the controller 30 characterizes the sensed body portion (e.g., torso/head or non-torso/head) and controls deployment suppression accordingly. In the embodiment disclosed herein, three or less thresholds being exceeded results in the air bag deployment being permitted upon the occurrence of a crash condition. Four or more thresholds being exceeded results in the deployment of the air bag 18 being suppressed upon the occurrence of a crash condition. Thus, the number "three" is the threshold number that must be exceeded.

Table 1 is a truth table indicating the possible body portion detection scenarios for the six capacitors A–F (i.e., the six unique pairs of plates) in which deployment of the air bag 18 is still permitted. In other words, even if a certain portion (e.g., an arm) of the occupant 14 is located in close proximity to the sensor matrix 42, and thus the inflatable occupant protection module 16, the air bag 18 is deployed during a crash condition. Specifically, if three or less of the total six thresholds are exceeded, deployment is still

TABLE 1

DEPLOY

| | | | | | | | | | | | | | | | | | | | | | |
|---|---|---|---|---|---|---|---|---|---|---|---|---|---|---|---|---|---|---|---|---|---|
| A | 1 | 0 | 0 | 0 | 0 | 0 | 1 | 1 | 1 | 1 | 1 | 0 | 0 | 0 | 0 | 0 | 0 | 0 | 0 | 0 | 0 |
| B | 0 | 1 | 0 | 0 | 0 | 0 | 1 | 0 | 0 | 0 | 0 | 1 | 1 | 1 | 1 | 0 | 0 | 0 | 0 | 0 | 0 |
| C | 0 | 0 | 1 | 0 | 0 | 0 | 0 | 1 | 0 | 0 | 0 | 1 | 0 | 0 | 0 | 1 | 1 | 1 | 0 | 0 | 0 |
| D | 0 | 0 | 0 | 1 | 0 | 0 | 0 | 0 | 1 | 0 | 0 | 0 | 1 | 0 | 0 | 1 | 0 | 0 | 1 | 1 | 0 |
| E | 0 | 0 | 0 | 0 | 1 | 0 | 0 | 0 | 0 | 1 | 0 | 0 | 0 | 1 | 0 | 0 | 1 | 0 | 1 | 0 | 1 |
| F | 0 | 0 | 0 | 0 | 0 | 1 | 0 | 0 | 0 | 0 | 1 | 0 | 0 | 0 | 1 | 0 | 0 | 1 | 0 | 1 | 1 |

| | | | | | | | | | | | | | | | | | | | | |
|---|---|---|---|---|---|---|---|---|---|---|---|---|---|---|---|---|---|---|---|---|
| A | 1 | 1 | 1 | 1 | 1 | 1 | 1 | 1 | 1 | 1 | 0 | 0 | 0 | 0 | 0 | 0 | 0 | 0 | 0 | 0 |
| B | 1 | 1 | 1 | 1 | 0 | 0 | 0 | 0 | 0 | 0 | 1 | 1 | 1 | 1 | 1 | 1 | 0 | 0 | 0 | 0 |
| C | 1 | 0 | 0 | 0 | 1 | 1 | 1 | 0 | 0 | 0 | 1 | 1 | 1 | 0 | 0 | 0 | 1 | 1 | 1 | 0 |
| D | 0 | 1 | 0 | 0 | 1 | 0 | 0 | 1 | 1 | 0 | 1 | 0 | 0 | 1 | 1 | 0 | 1 | 1 | 0 | 1 |
| E | 0 | 0 | 1 | 0 | 0 | 1 | 0 | 1 | 0 | 1 | 0 | 1 | 0 | 1 | 0 | 1 | 1 | 0 | 1 | 1 |
| F | 0 | 0 | 0 | 1 | 0 | 0 | 1 | 0 | 1 | 1 | 0 | 0 | 1 | 0 | 1 | 1 | 0 | 1 | 1 | 1 |

Conversely, Table 2 is a truth table in which the deployment of the air bag 18 is suppressed, even when a crash condition occurs. Specifically, if four or more of the six sensors (i.e., pairs of plates) have signals that exceed their respective threshold value, the actuation of the air bag 18 is suppressed.

TABLE 2

SUPPRESS

| | | | | | | | | | | | | | | | | | | | | | | |
|---|---|---|---|---|---|---|---|---|---|---|---|---|---|---|---|---|---|---|---|---|---|---|
| A | 1 | 1 | 1 | 1 | 1 | 1 | 1 | 1 | 1 | 1 | 0 | 0 | 0 | 0 | 0 | 1 | 1 | 1 | 1 | 1 | 0 | 1 |
| B | 1 | 1 | 1 | 1 | 1 | 1 | 0 | 0 | 0 | 0 | 1 | 1 | 1 | 1 | 0 | 1 | 1 | 1 | 1 | 0 | 1 | 1 |
| C | 1 | 1 | 1 | 0 | 0 | 0 | 1 | 1 | 1 | 0 | 1 | 1 | 1 | 0 | 1 | 1 | 1 | 1 | 0 | 1 | 1 | 1 |
| D | 1 | 0 | 0 | 1 | 1 | 0 | 1 | 1 | 0 | 1 | 1 | 1 | 0 | 1 | 1 | 1 | 1 | 0 | 1 | 1 | 1 | 1 |
| E | 0 | 1 | 0 | 1 | 0 | 1 | 1 | 0 | 1 | 1 | 1 | 0 | 1 | 1 | 1 | 1 | 0 | 1 | 1 | 1 | 1 | 1 |
| F | 0 | 0 | 1 | 0 | 1 | 1 | 0 | 1 | 1 | 1 | 0 | 1 | 1 | 1 | 1 | 0 | 1 | 1 | 1 | 1 | 1 | 1 |

Figure 4:
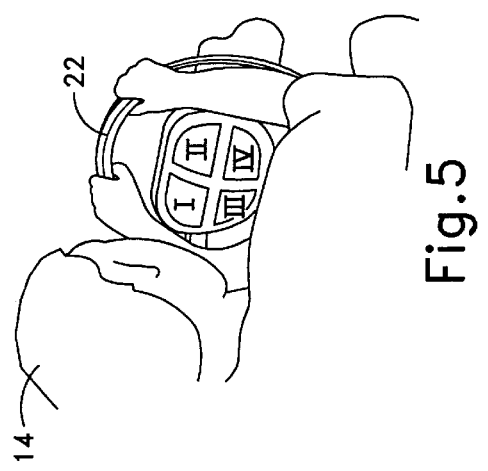
FIG. 4 is a perspective view of the sensor matrix located on a steering wheel of the vehicle shown in FIG. 1.

To illustrate some of the possible positions of body portions of the occupant 14 relative to the protection module the attention of the reader is directed to FIG. 4, which is a perspective illustration of the steering wheel 22 and shows the four capacitor plates $48_I$–$48_{IV}$. It should be recalled that the occupant protection module 16 is just behind (in the reference frame of FIG. 4) the hub cover 44, which contains the sensor matrix 42.

Figure 5:
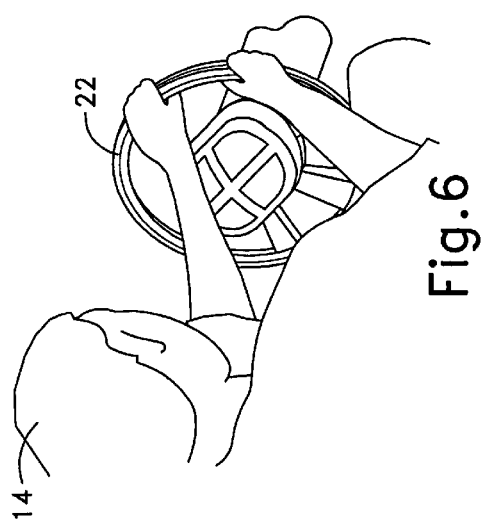
FIGS. 5–9 are views similar to FIG. 4 and additionally show the occupant in various positions with regard to the sensor matrix.

FIG. 5 illustrates the occupant 14 (i.e., the driver) located in a normal driving position (i.e., the driver is not in the OOP zone). In FIG. 5, the occupant's hands are located at the ten o'clock and two o'clock position on the steering wheel 22. The arms of the occupant 14 are located near the outside edges of the sensor matrix 42. Accordingly, most or all of the capacitors A–F (FIG. 3, the capacitors A–F are represented in FIG. 3 by plain connector lines) do not have a capacitance value that indicates a proximately located body portion. In some circumstances, only the capacitive value between sensor plates $48_I$ and $48_{III}$ (i.e., the capacitor B) and the capacitive value between plates $48_{II}$ and $48_{IV}$ (i.e., capacitor C) will be indicative of a proximately located body portion. The sensed body portion is characterized within the deployment suppression determination function 58 of the controller 30 as being non-torso/non-head. If a crash condition would occur for the occupant 14 shown in FIG. 5, it is desirable to deploy the air bag to help protect the occupant 14.

Figure 6:
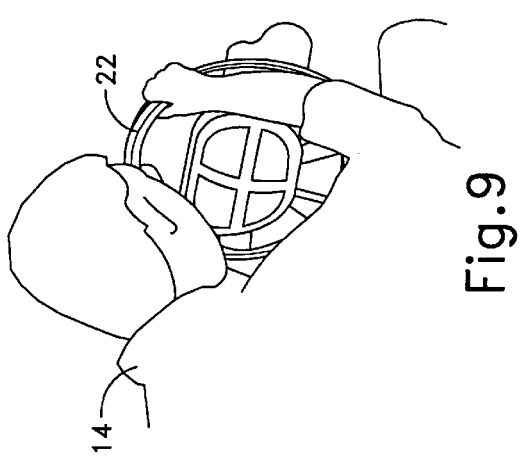

FIG. 6 illustrates an occupant 14 turning the steering wheel 22 in a right-hand turn. The left arm of the occupant 14 extends across sensor matrix 42. The occupant is still located in a position that is not within the occupant OOP zone. Accordingly, if a crash condition were to occur, it maybe desirable to actuate the air bag 18. Only a few (i.e., a minority) of the capacitors A–F may have a capacitive value that results in the respective signal 54 exceeding the respective threshold (i.e., indicative of a body portion being located in close proximity) due, in part, to the small relative size (e.g., bulk) of the arm of the occupant 14 compared to the torso or head of the occupant. The sensed body portion is characterized within the deployment suppression determination function 58 of the controller 30 as being non-torso/non-head. For the situation shown in FIG. 6, if a crash condition were to occur, the deployment suppression determination function does not suppress deployment of the air bag.

Figure 7:
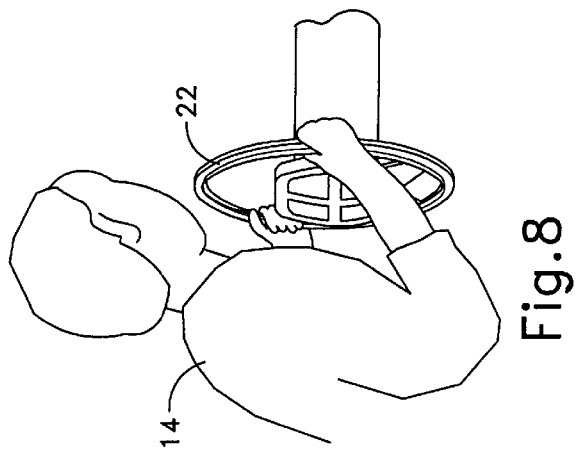

FIG. 7 is similar to FIG. 6, but shows the driver actuating a left-hand turn. Similar to the situation shown in FIG. 6, the arm of the occupant may cause only a few of the capacitors A–F to have a capacitive value that results in the respective signal 54 exceeding the respective threshold (i.e., indicative of a body portion being located in close proximity). Also, the occupant 14 is located in a position that is not within the OOP zone. Thus, similar to the situation shown in FIG. 6, if a crash condition were to occur, the deployment suppression determination function does not suppress deployment of the air bag.

Figure 8:
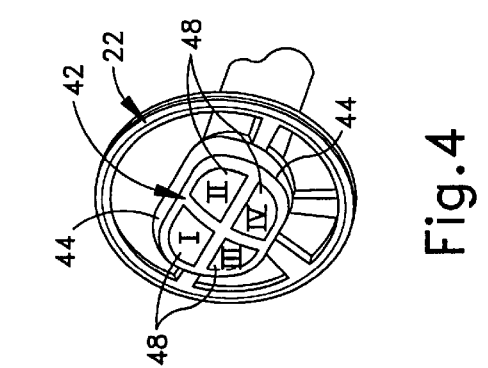

FIG. 8 illustrates the occupant 14 in a position that is within the OOP zone. The torso of the 14 occupant is located at a relative close proximity to the sensor matrix 42. A majority (e.g., all) of the capacitors A–F provide a signal indicative of the closely located occupant torso. A majority (e.g., all) of the thresholds are exceeded, and the deployment suppression determination function 58 of the controller 30 characterizes the sensed body portion as a torso/thorax/head. Accordingly, if a vehicle crash condition were to occur, it is desirable to suppress actuation of the air bag.

Figure 9:
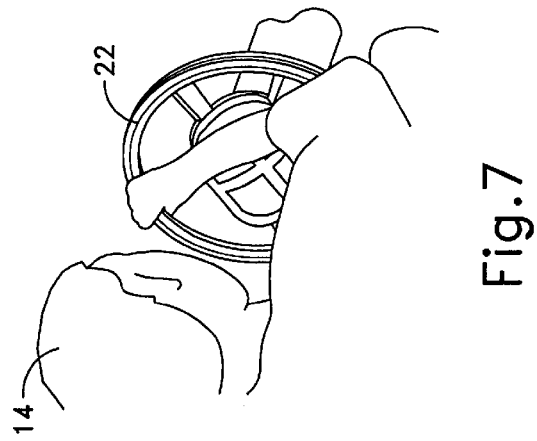

FIG. 9 illustrates the occupant's head and thorax located in close proximity to the sensor matrix 42. Similar to FIG. 8, the occupant is located in the OOP zone. Thus, similar to FIG. 8, all or most of the sensor pairs provide a signal indicative of the closely located occupant body portion and the sensed body portion is characterized as a torso/thorax/head. If a vehicle crash condition were to occur, it is desirable to suppress actuation of the air bag.

Figure 10:
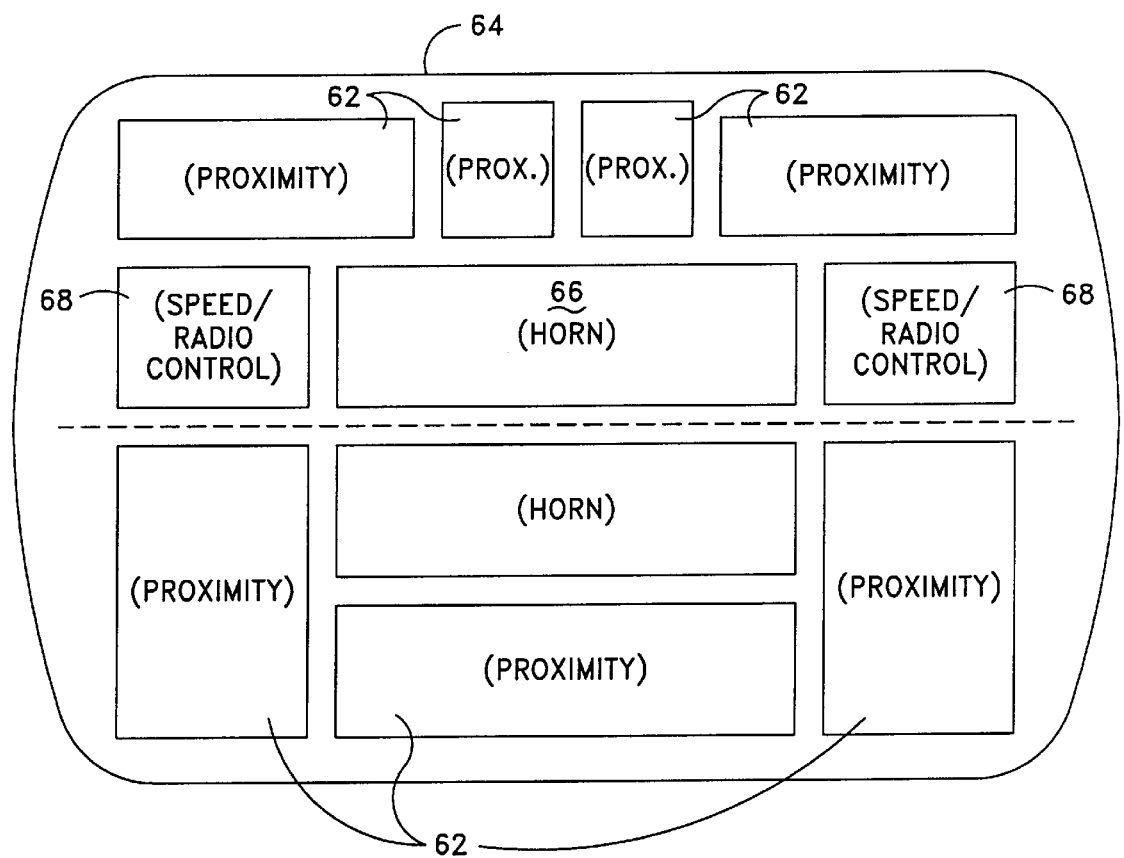
FIG. 10 is an illustration of an alternative embodiment of the sensor matrix.

FIG. 10 illustrates another embodiment of the present invention that shows seven capacitor plates 62 for body part proximity sensing. A capacitive coupling can be sensed between each plate 62 and the other six plates. The plates 62 are adjacent to other structure located within a hub cover 64. The other structure may include a horn pad circuit 66 and speed control/radio control circuits 68 or other various controls/elements. These controls/elements may have dual functions and act as one of the capacitive plates.

As an alternative to the capacitive coupling effect employed by the sensor matrix of FIG. 2 and the sensor matrix of FIG. 10, a system in accordance with the present invention could employ the plurality of plates as capaciflectors. For example, for the embodiment of FIG. 2, each of the four sensor plates would act as a plate for a capaciflector. Accordingly, each plate, alone, is used to sense a proximately located body portion (i.e., four proximity indicative signals for the four-plate system and seven signals for the seven-plate system). Capaciflectors are known in the art and thus a particular structure is not discussed herein for brevity. The deployment suppression determination function of the controller employs appropriate truth tables for capaciflector use. For example, if a majority of the thresholds are exceeded, deployment of the air bag is suppressed. If the number of thresholds that are exceeded is not a majority (i.e., 3 or less), the deployment of the air bag would be permitted upon the occurrence of a crash condition.

From the above description of the invention, those skilled in the art will perceive improvements, changes and modifications. For example, the protection system 10 could have other occupant sensor systems in addition to the occupant sensor system 40. One example of such other occupant sensor systems includes an occupant weight sensor. Also, the occupant sensor system 40 could be modified such that deployment suppression determination function 58 of the controller 30 does not make a plurality of discrete threshold determinations (i.e., one for each sensor). Instead, the values of the signals 54 are continuously monitored and an algorithm processes the signal information in a continuous format to determine an overall exceedance valve. Further, because the present invention can be used for passenger sensor systems, the characterization of the sensed body portion may be for other body portions, such as a leg/foot. In other words, the sensor system would sense a limb other than an arm/hand. This would be the case if a passenger crosses a leg in front of a sensor matrix. Such improvements, changes and modifications within the skill of the art are intended to be covered by the appended claims.

Having described the invention, the following is claimed:

1. An occupant sensor system comprising:
   an array of sensor means, each of said sensor means sensing the presence of a body portion of an occupant proximately located to said respective sensor means and providing a signal indicative of said presence; and
   means for processing in formation derived from said signals to characterize the body portion as to its type.

2. A system as set forth in claim 1, wherein said means for processing including means for characterizing the type of body portion as a torso/head or a limb.

3. A system a s set forth in claim 2, wherein said means for processing includes means for characterizing the type of body portion as a torso/head or an arm/hand.

4. A system as set forth in claim 1, wherein each of said sensor means includes means for sensing a capacitance indicative of the proximately located body portion, and said sensor means includes means for providing a signal having a characteristic indicative of a value of the sensed capacitance.

5. A system as set forth in claim 4, wherein each of said means for sensing a capacitance includes a pair of capacitive plates.

6. A system as set forth in claim 4, wherein said means for processing includes means for determining whether a value of the characteristic of the signal exceeds a predetermined threshold value.

7. A system as set forth in claim 6, wherein said means for processing includes means for determining a number of the signals that have characteristic values that exceed their respective threshold values and for providing a signal indicative of whether the number exceeds a predetermined threshold number.

8. A system as set forth in claim 6, wherein said means for processing includes means for determining an exceedance valve.

9. A system as set forth in claim 1, wherein said means for processing includes means for providing a signal to control an actuatable occupant protection device.

10. A system as set forth in claim 1, wherein said sensor system is part of an overall sensor arrangement.

11. A system as set forth in claim 1, wherein each of said sensor means includes an electrical conductor.

12. An occupant sensor system comprising:
a sensor array having a plurality of sensor means, each for sensing a proximity of an occupant body portion and for providing a signal indicative of said proximity; and
means for processing information derived from the signals provided by said plurality of sensor means to make a characterization of the proximately located occupant body portion and for providing a signal indicative of said characterization.

13. A system as set forth in claim 12, wherein said means for processing includes means for characterizing the proximately located body portion as a torso/head or a limb.

14. A system as set forth in claim 13, wherein said means for processing includes means for characterizing the proximately located body portion as a torso/head or an arm/head.

15. A system as set forth in claim 12, wherein each of said sensor means includes means for sensing a capacitance indicative of the proximity of the proximately located body portion, and said sensor means includes means for providing the signal to have a characteristic indicative of a value of the sensed capacitance.

16. A system as set forth in claim 15, wherein each of said means for sensing a capacitance includes a pair of capacitive plates.

17. A system as set forth in claim 15, wherein said means for processing includes means for determining whether a value of the characteristic of the signal exceeds a predetermined threshold value.

18. A system as set forth in claim 17, wherein said means for processing includes means for determining a number of the signals that have characteristic values that exceed their respective threshold values and for providing a signal indicative of whether the number of signals exceeds a predetermined threshold number.

19. A system as set forth in claim 12, wherein said means for processing includes means for providing a signal to control an actuatable occupant protection device.

20. A system as set forth in claim 12, wherein said sensor system is part of an overall sensor arrangement.

21. A system as set forth in claim 12, wherein each of said sensor means includes an electrical conductor.

22. An occupant sensor system comprising:
a capacitive sensor plate array having a plurality of capacitive plates, each capacitive plate being arranged to pair itself with each of the other capacitive plates to define a capacitor having a capacitive value, the capacitive value being indicative of proximity of a body portion of an occupant to the respective pair of capacitive plates;
means for sensing the capacitive value of each pair of capacitive plates and for providing signals indicative of said capacitive values; and
means for processing information derived from the signals to make a characterization of the proximately located occupant body portion and for providing a signal indicative of said characterization.

23. A system as set forth in claim 22, wherein said means for processing includes means for characterizing the proximately located body portion as a torso/head or a limb.

24. A system as set forth in claim 23, wherein said means for processing includes means for characterizing the type of body portion as a torso/head or an arm/hand.

25. A system as set forth in claim 22, wherein said means for processing includes means for determining whether the capacitive value of each pair of capacitive plates exceeds a predetermined threshold value.

26. A system as set forth in claim 25, wherein said means for processing includes means for determining a number of pairs of capacitive plates that have a capacitive value exceeding their respective threshold values and for providing a signal indicative of whether the number of pairs of capacitive plates exceeds a predetermined threshold number.

27. A system as set forth in claim 22, wherein said means for processing includes means for providing a signal to control an actuatable occupant protection device.

28. An occupant protection system comprising:
an array of sensor means, each of said sensor means sensing the presence of a body portion of an occupant proximately located to said respective sensor means and providing a signal indicative of said presence;
means for processing information contained within said signals to characterize the body portion as to its type;
actuatable protection means for helping to protect an occupant; and
means for controlling actuation of said protection means in response to the characterization of the type of the body portion.

29. A system as set forth in claim 28, wherein said means for processing including means for characterizing the type of body portion as a torso/head or an arm/hand.

30. A system as set forth in claim 28, wherein each of said sensor means includes means for sensing a capacitance of the proximately located body portion, and each of said sensor means includes means for providing a signal to have a characteristic indicative of a value of the sensed capacitance.

31. A system as set forth in claim 30, wherein each of said means for sensing a capacitance includes a pair of capacitive plates.

32. A system as set forth in claim 30, wherein said means for processing includes means for determining whether a value of the characteristic of the signal exceeds a predetermined threshold value.

33. A system as set forth in claim 30, wherein said means for processing includes means for determining a number of the signals that have characteristic values that exceed their respective threshold values and for providing a signal indicative of whether the number of signals exceeds a predetermined threshold number.

34. An occupant sensing method comprising:

providing an array of sensor means;

sensing the presence of a body portion of an occupant proximately located to each sensor means;

providing signals indicative of the sensed presence; and processing information derived from the signals to characterize the body portion as to its type.

35. An occupant sensing method comprising:

providing a sensor array having a plurality of sensor means;

sensing a proximity of an occupant body portion to each sensor means;

providing a signal indicative of the sensed proximity for each sensor means;

processing information derived from the signals provided for each sensor means;

making a characterization of the proximately located occupant body portion based upon the processing; and providing a signal indicative of the characterization.

36. An occupant sensing method comprising:

providing a capacitive sensor plate array having a plurality of capacitive plates;

arranging each capacitive plate to pair the plate with each of the other capacitive plates to define a capacitor having a capacitive value, the capacitive value being indicative of proximity of a body portion of an occupant to a respective pair of capacitive plates;

sensing the capacitive value of each pair of capacitive plates;

providing signals indicative of the capacitive values;

processing information derived from the signals to make a characterization of the proximately located occupant body portion; and providing a signal indicative of the characterization.

37. An occupant protection method comprising:

providing an array of sensor means;

sensing the presence of a body portion of an occupant proximately located to each sensor means;

providing signals indicative of the sensed presence;

processing information contained within the signals to characterize the body portion as to its type; and controlling actuation of actuatable protection means to help to protect an occupant in response to the characterization of the type of the body portion.

* * * * *